United States Patent [19]

Grillos

[11] 3,853,443

[45] Dec. 10, 1974

[54] APPARATUS FOR THE EXTERNAL COATING OF A PIPELINE WITH FOAMED PLASTIC

[75] Inventor: William J. Grillos, Midland, Tex.

[73] Assignee: Shell Oil Company, New York, N.Y.

[22] Filed: Dec. 31, 1968

[21] Appl. No.: 803,511

Related U.S. Application Data

[62] Division of Ser. No. 604,256, Dec. 23, 1966, abandoned.

[52] U.S. Cl.............. 425/115, 425/329, 425/817 C
[51] Int. Cl............................................... B29f 3/10
[58] Field of Search ...... 264/47; 425/113, 114, 115, 425/4 C, 329, 371, 446, 817 C; 118/DIG. 11

[56] References Cited
UNITED STATES PATENTS

| | | | |
|---|---|---|---|
| 2,186,361 | 1/1940 | Bryan et al. ............. | 118/DIG. 11 X |
| 2,194,268 | 3/1940 | Cummings .................. | 118/DIG. 11 |
| 2,470,994 | 5/1949 | Kremko et al. ............. | 118/DIG. 11 |
| 2,968,081 | 1/1961 | Williamson et al. ........ | 425/113 |
| 3,354,503 | 11/1967 | Joseph et al. ............ | 425/224 |

FOREIGN PATENTS OR APPLICATIONS

| | | |
|---|---|---|
| 1,420,449 | 11/1965 | France |
| 1,105,422 | 3/1968 | Great Britain |

Primary Examiner—J. Spencer Overholser
Assistant Examiner—David B. Smith

[57] ABSTRACT

A pipeline coating apparatus for applying a plastic, preferably polyurethane, to a pipeline and maintaining the plastic in a fixed cross-sectional shape until the plastic cures to thereby coat the pipeline with a foamed plastic. A travelling frame adapted to surround and move along the pipeline includes a sleeve of endless belts forming a curing chamber. The liquid plastic is injected into the leading end of the chamber where it cures to a foamed state. The endless belts, being free to move, prevent relative movement between the plastic and the inner surface of the belts thus preventing sliding contact which could damage the plastic coating.

1 Claim, 6 Drawing Figures 3,853,443

PATENTED DEC 10 1974   3,853,443

APPARATUS FOR THE EXTERNAL COATING OF A PIPELINE WITH FOAMED PLASTIC

This application is a division of Ser. No. 604,256 filed Dec. 23, 1966, now abandoned.

Foamed plastics, in particular foamed polyurethane, are known to be excellently suitable for thermal insulation. For this reason it has already been proposed to use foamed plastics for insulating pipelines for the transportion of the liquids or gases the temperature of which differs considerably from the ambient temperature. Such cases occur with lines belonging to coolers, lines for liquefied natural gas or other liquefied hydrocarbon gases, steam and hot-water lines, oil lines through which heated oil flows, or lines for transporting oil at normal temperature in very cold regions.

Lines of this type can be insulated by surrounding separate line sections, whether or not combined to form a line, with a coating of foamed plastic. This can be done either by placing separate pipe joints in a mold and coating them with a foamed plastic, or by fitting a permanent or subsequently removable mold around a line which has already been laid. These are, however, all discontinuous methods; they are heavy on manpower, especially in the case of long lines, and often result in a discontinuous and interrupted coating which has to be given an aftertreatment in order to obtain a good continuous insulation.

It is an object of the invention to provide a method and apparatus by which a pipeline, in particular a pipeline of relatively large diameter and of considerable length, can be provided continuously with an insulating layer at the place where this pipeline has been laid and in such a way as not to require much man-power.

The method of the invention is characterized in that a travelling frame including a sleeve serving as a mold for the coating layer is continuously moved over and along the line, which sleeve leaves an annular space around the line, and that at the front end of this space (taken in the direction of movement of the sleeve) the coating material is continuously supplied in a non-foamed or not completely foamed state, which material expands in the sleeve, cures in the form of foam, and issues as a cured foam at the rear end of the sleeve.

At the front of the sleeve, a flexible sealing member is provided which seals off the annular space between the sleeve and the pipeline on this side and which prevents the coating material from escaping. At the front the sleeve is supported at a point before that at which the insulating material is introduced and centered on the outer surface of the line by a vehicle which travels along the line and is constructed in such a way that no supporting contacts between line and sleeve are required at the place where the plastic expands and cures.

The sleeve or mold may be moved uniformly along the line in various ways. The vehicle may be provided with a prime mover, for example, it may be connected to a cable which is uniformly wound on a stationary winch. It is, however, much more preferable, especially in the event of long lines of for instance a few kilometers, to equip the vehicle with a motor for moving the sleeve. This motor may for instance actuate a winch for winding up a cable which is detachably secured to the line at some distance ahead of the sleeve. To prevent interruptions in the forward movement of the sleeve, two winches may be employed alternately, each operating with a separate cable. The cable which is not in use is then secured to the line at a further point along the line and can be put into operation when the cable which is in use has been wound up on the winch almost to its end.

It is also possible to equip the vehicle with a motor which drives the wheels or caterpillars of the vehicle.

If the sleeve consists of a cylindrical jacket, its inner face, when the sleeve is moving, will rub against the still soft mass of foam in the process of formation, which is detrimental both to the form and to the structure of the final coating. This drawback cannot entirely be obviated by "lubricating" the inner surface of the sleeve with substances which prevent adherence of the foam to the surface and which reduce the friction. It is possible to insert a layer of filmy material between the inner wall of the sleeve and the coating, which filmy layer does not move relative to the coating but remains adhering to it as a surface coating. In this way any abrasive effect of the inner wall of the sleeve on the coating is prevented, at the cost, however, of substantial complications in respect of the required equipment and operations. It is better to ensure that the inner face of the sleeve does not move relative to the line. This can be achieved by making the inner face of the sleeve movable relative to the sleeve as a whole, a feature which can be realized by composing this face of endless belts running over pulleys, which belts extend axially with respect to the sleeve, and of which the parts facing the centerline of the sleeve join each other laterally, the cross-sectional shape of the inner face of the sleeve being a polygon.

By way of example the invention will now be elucidated with reference to the accompanying schematic drawing, in which.

Figure 1:
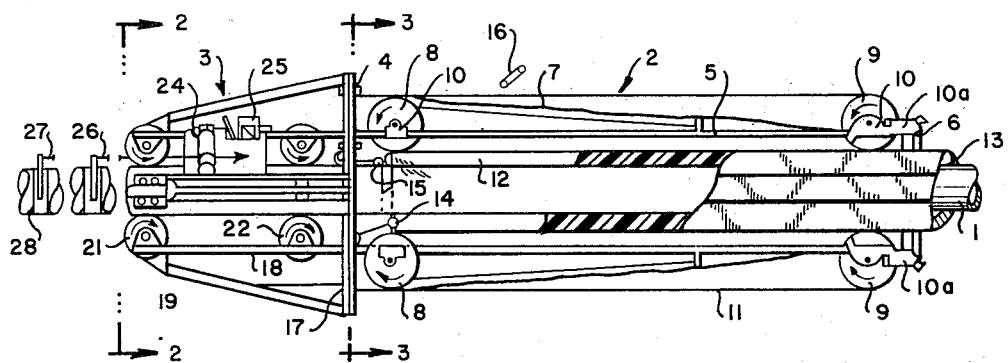
FIG. 1 is a side view and a partial cross-section of an apparatus according to the invention provided with a vehicle moved along the pipeline by means of cables.

The apparatus according to FIGS. 1–4 is designed to be drawn forward by means of cables which are detachably secured to another point of the line.

With reference to the drawing the pipeline to be coated is designated by the numeral 1, while the apparatus to be moved along the line may be considered to consist of two parts, namely the part which is designated in its entirety by the numeral 2 and is used to apply the coating and which will hereinafter usually be referred to as "sleeve construction," and the part which is designated in its entirety by the numeral 3 and serves to keep the said first part properly centered and to move it forward and which second part will hereinafter usually be referred to as "vehicle." Parts 2 and 3 are united, for example, by means of bolts.

Figure 2:
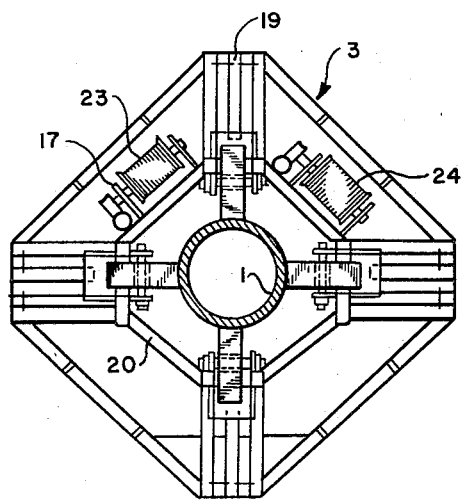
FIG. 2 is a view of the vehicle taken along line 2—2 of FIG. 1.
Figure 3:
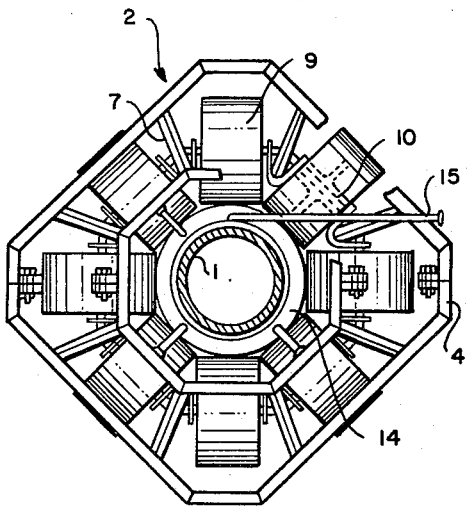
FIG. 3 is a cross-section taken along line 3—3 of FIG. 1.
Figure 4:
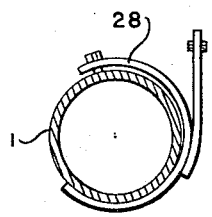
FIG. 4 is a cross-section of a pipeline showing a cable clamp fastened to the pipeline.

In the embodiment shown in FIGS. 1–3, the sleeve construction 2 consists of an extended cage-shaped framework secured to a supporting frame 4 and assembled from eight longitudinal beams 5 arranged circularly around the centerline of the apparatus which beams are fastened at one end to the supporting frame 4 and at the other end to an octagonal ring 6. To improve the rigidity of the system struts 7 run from about the central points of the longitudinal beams 5 to the supporting frame 4. Near the front end (on the left in FIG. 1) and near the rear end (on the right in FIG. 1) of the sleeve construction a circular arrangement of broad pulleys, 8 and 9, respectively, is mounted between every two longitudinal beams, which pulleys are rotatable around shafts 10 supported at their ends by the longitudinal beams 5.

As shown in FIG. 3, the pulleys 8, 9 are wide enough to nearly touch each other at the sides facing the centerline of the apparatus. An endless belt 11 is laid over each pair of pulleys 8, 9 axially corresponding with each other, the parts of which belt facing the centerline of the apparatus are as wide as the pulleys 8, 9, thus forming an octagonal, substantially continuous wall around the pipeline to be coated and leaving an annular space 12 around the pipeline. While the apparatus moves forward gradually, i.e., to the left in the drawing, the components of the insulating layer to be formed are injected in the liquid state into the front end of the space 12. During its residence in the sleeve the injected material obtains a foamed structure, after which it cures fairly rapidly so that the pipeline 1 is provided at the rear end with a foamed plastic coating 13 having an externally octagonal shape. The supply of the foam material in the liquid state takes place near the pulleys 8, where a flexible sealing ring 14 which closes the space 12 and which presses elastically against the pipeline, is arranged between the sides of the pulleys 8 facing the centerline of the apparatus, and the still uncoated part of the line, which ring is supported by the supporting frame 4. On the upper side of the pipeline 1 the feed line 15 for the insulating material terminates in this sealing ring 14, which material is continuously supplied at the rate and in the composition required during the uniform forward movement of the apparatus. The mass of forming and subsequently curing in the space 12 will exert pressure on the parts of the belts 11 which are in contact with it and the friction resulting therefrom between the mass and these parts will ensure that the parts do not move relative to the mass of foam. This means that, owing to the forward movement of the apparatus the pulleys 8 and 9 will rotate in the direction of the arrows. During or after formation of the coating the sleeve will therefore not exert any longitudinal force on this coating such as may adversely affect the structure of the coating. In choosing the material for the belts the nature of the foamed plastic should inter alia be taken into account; suitable material may, for instance, be a polished thin steel strip of plastic or rubber, whether or not reinforced with fibrous or other material. In order to be able to adjust the tension in the belts, the pulleys 9 may, for instance, be moved along the length of the apparatus by means of tension rods 10A. If it is necessary to prevent entirely any adhesion between the belts and the foamed material a lubricant or an anti-adhesive may be applied to the belts, by an applicator shown schematically at 16. To prevent the belt parts which face inwards from bulging as a result of the pressure exerted normal thereto by the mass of foam, these parts may be supported at the back by one or more rollers or by a guide plate (not shown). In order to ensure a good connection between the adjacent edges of the belts at the point where the belts 11 form the space 12, these edges may be of a special design, characterized for instance by thickened parts or by lips which fit against or into each other. As a rule there is no objection to the coating being not circular but polygonal in cross-section. If this should constitute a drawback, it is possible to permit at least the inner parts of the flexible belts to be given a transversely curved profile by supporting these inner parts on the reverse side by means of hollow supporting plates or idlers disposed in a curve. The pressure of the foam presses the inner parts of the belts against the idlers or supporting plates, causing the belts to form together a substantially circular cylindrical surface.

The entire sleeve construction 2 will be made as light as possible, while retaining the required rigidity. The front end of the sleeve construction is supported and centered by the still uncoated line through the intermediary of a vehicle 3, which will now be more fully described and which, in addition to supporting and centering, has the function of uniformly moving the apparatus along the pipeline.

The vehicle 3 consists of a framework fastened to a supporting frame 17 and assembled from a number of longitudinal beams 18, struts 19 and ties 20.

The supporting frames 4 and 17 are firmly connected to each other by means of a number of bolts.

In order to center the vehicle and thus the entire apparatus on the pipeline and to enable it to move along the line without much friction, four pairs of wheels 21 and 22, uniformly distributed circumferentially, are rotatably mounted in the framework and in rolling contact with the surface of the still uncoated pipeline. The wheels 21 and 22 are situated axially at some distance from each other so as to obtain a good centering over the entire length of the apparatus and to counteract tilting moments caused by the far over-hanging sleeve construction. In order to propel the apparatus the vehicle is provided with two winches 23 and 24, each driven by an adjustable and reversible motor 25. The cables 26 and 27 wound on the winches each have a clamp 28 at their free ends, which clamp can be fixed on the line 1 at any given point (see FIG. 4). The apparatus is moved forward in the following manner. Let it be assumed that, for instance, the cable 27 with the relevant clamp 28 has been secured to the pipeline at a sufficiently large distance ahead of the apparatus. The appropriate winch 24 is rotated by the motor 25 in a direction such as will enable the winch to wind up the cable 27 and thus to draw the apparatus towards the fixed clamp of cable 27. In the meantime the cable 26 is payed out by means of the winch 23, the motor of which is made to turn in a contrary direction, and the relevant clamp is attached at a point further along the line. Once the cable 27 has been almost fully wound on the winch the second motor is started so that cable 26 can take over the function of cable 27, whereupon motor 25 is stopped and cable 27 is operated in the same way as cable 26 previously. In this way an uninterrupted, uniform forward movement of the apparatus along the line is obtained.

The vehicle will preferably be provided with a weight on the underside to prevent rotation of the apparatus round the centerline.

The wheels 21 and 22 are preferably provided with hard-rubber treads.

In order to be able to fit the apparatus around the pipeline at any given point the apparatus will be so constructed as to be divisible, for instance, along a diametrical plane, into two halves, which can be placed separately around the line and combined to form one whole, for example, by means of bolts.

Although in the embodiment shown in FIGS. 1–3 the sleeve is made up of eight endless belts, it will be clear that the number can be larger or smaller according to the requirement. It is also possible, of course, to make the belts in the apparatus inter-changeable with belts of a different width, in which case the wheels and shafts for the belts are also inter-changeable or adjustable. In this way the apparatus is suitable for applying coatings of various thicknesses or for coating pipes of different diameters.

Figure 5:
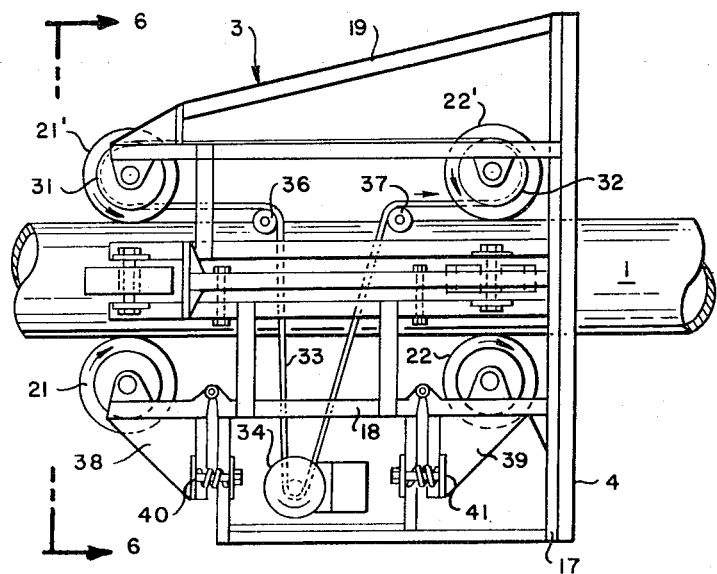
FIG. 5 is a side view of a modified construction showing a vehicle movable along the pipeline with driven wheels for moving the apparatus according to the invention; and, FIG. 6 is a cross-section of the vehicle according to FIG. 5 taken along line 6—6.
Figure 6:
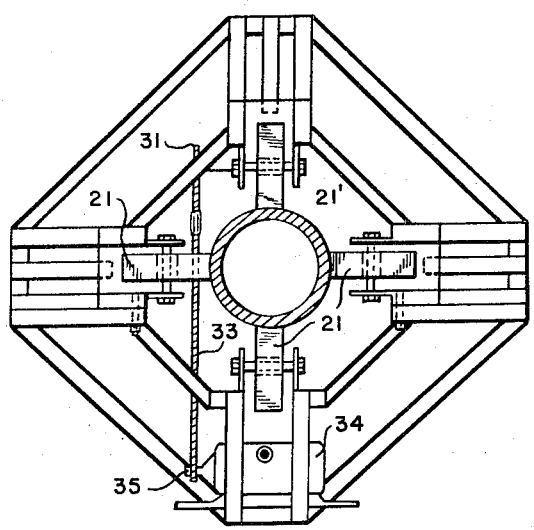

FIGS. 5 and 6 show a different design of the vehicle in which all parts of the driving mechanism are mounted on the vehicle itself.

This design also comprises a supporting frame 17 connected to the supporting frame 4 of the sleeve construction, e.g., by means of bolts, a number of longitudinal beams 18 and struts 19, supported by the supporting frame 17. This construction is likewise provided with four pairs of wheels 21, 22, 21', and 22', travelling along the pipeline, of which only the upper wheels 21' and 22' are driven. For this purpose the shafts of these wheels are fitted with sprocket wheels 31, 32 engaging with a chain 33 driven by a motor 34 having a sprocket-wheel 35 mounted on its shaft. Between sprocket wheel 35 and the sprocket wheels 31 and 32 the chain passes over guide wheels 36 and 37.

The two lower travelling wheels 21 and 22 are each fitted on cradles 38 and 39, respectively, hingeably mounted on the framework, and are pressed elastically with a practically constant force against the bottom part of the pipeline by means of compression springs 40 and 41, respectively, acting on the cradles. In this manner the driven wheels 21', 22' are constantly in contact with the surface of the pipeline with sufficient force to prevent these wheels from slipping. At the same time irregularities in the pipeline (e.g., welding seams) will not form an obstacle to the forward movement of the construction.

The wheels 21, 22, 21' and 22' are all mounted in ball-bearings and are provided with hard-rubber treads.

When mounting the motor with the relevant parts such as speed controllers, couplings, etc., in the lower part of the vehicle, it is not necessary to use a separate weight to prevent rotation of the apparatus around the centerline of the pipeline.

The motor may be an electric, pneumatic or hydraulic motor and may, for instance, be powered by a generator travelling on a trolley along the pipeline with the coating apparatus.

For propulsion of the apparatus the vehicle according to FIGS. 5 and 6 will generally be preferred to that shown in FIGS. 1 and 2, since it requires less attention and takes up no space in front of the apparatus.

The apparatus according to the invention can be used as follows. Let it be assumed that the pipeline to be coated lies beside a trench in which the pipeline is to be lowered after having been coated. The part of the pipeline around which the apparatus has to be placed is raised to allow the apparatus to be fitted around it. At some distance in front of the apparatus the pipeline is hung in the sling of a tractor situated beside the trench and fitted with a lateral attachment from which the sling is suspended. The sling is provided with rollers, so that it can move easily along the pipeline suspended therein. A trailer drawn by the said tractor carries both the equipment for the supply of the insulating material and the apparatus for generating the power required to propel the apparatus. Once the required connections have been made, the tractor which holds the pipeline locally in a raised position, and the trailer with the auxiliary equipment are moved together with the coating apparatus at the desired speed along the pipeline. The coated part of the pipeline can be lowered into the trench behind the coating apparatus.

Foamed polyurethane is particularly suitable for use as insulating material for applying to the pipeline in the manner described above although other foamed plastics may be used. The various components for preparing this material can easily be fed in a liquid or plastic state to the front end of the sleeve. Shortly after the components have been mixed, foaming occurs, and it is possible to choose the composition of the polyurethane in such a way that the resultant foam will cure fairly rapidly, e.g., after only 1 minute. If desired, the coating material may be fed into the sleeve already in a partly foamed state, further foaming and expansion taking place within the sleeve.

I claim as my invention:

1. An apparatus for externally coating a pipeline with plastic comprising:

a travelling frame positioned around said pipeline and adapted to travel longitudinally therealong by means of pairs of wheels uniformly distributed circumferentially about said pipeline and rotatably mounted in said travelling frame and in rolling contact with said pipeline, each wheel of each pair of wheels being axially separated to center said travelling frame about said pipeline and to counteract tilting moments of an overhanging sleeve portion extending from said frame and spaced from said pipeline to thereby define a chamber around said pipeline, said sleeve portion including a series of longitudinally-extending endless belts peripherally disposed about and spaced from said pipeline to form a closed sleeve whereby the inner surface of said belts and the exterior of said pipeline define said chamber and further whereby said belts move to prevent sliding contact of said belts with said plastic when said travelling frame is moved along said pipeline, the inner surface of said belts being supported by transversely curved supports so that said belts provide a chamber of substantially circular cross section, the length of said sleeve portion being sufficiently great so as to support and retain said plastic for a time sufficient for said plastic to acquire a substantially rigid foamed state while in said chamber;

fluid discharge means attached to said frame at the leading end of said sleeve to inject a foamable plastic into said chamber as said frame moves along said pipeline;

a flexible sealing ring carried by said sleeve portion and positioned between the inner surface of said sleeve portion and the exterior of said pipeline, said sealing element pressing elastically against said pipeline and including opening means to permit access for said fluid discharge means to said chamber; prime mover means carried by the leading end of said travelling frame and operatively connected to said pipeline to move said frame along said pipeline, said prime mover means including at least one driven wheel in driving contact with said pipeline, at least one winch and one winch cable, and attaching means for fastening the free end of said winch cable to said pipeline.

* * * * *